March 13, 1951  J. D. BOLONGARO  2,544,747
MOTOR-DRIVEN SPADE
Filed Feb. 21, 1947  2 Sheets-Sheet 1
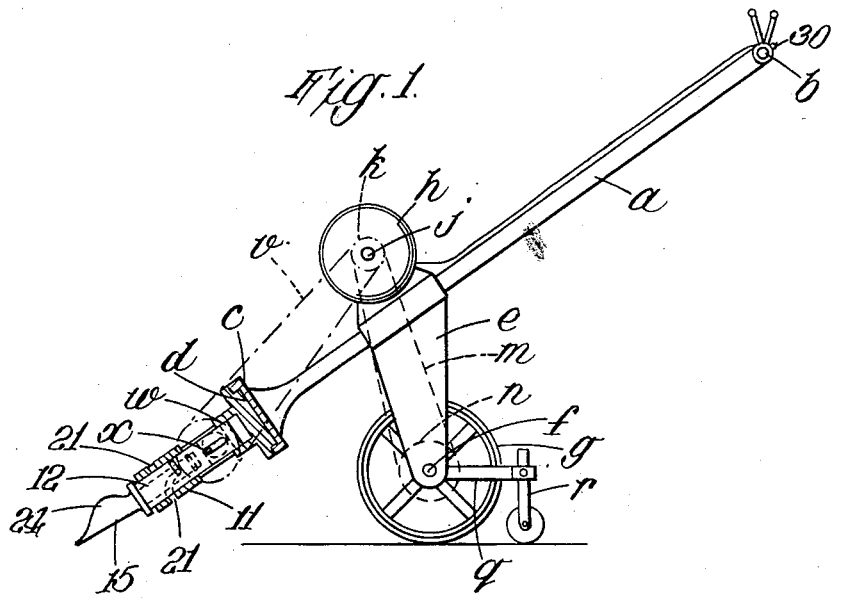
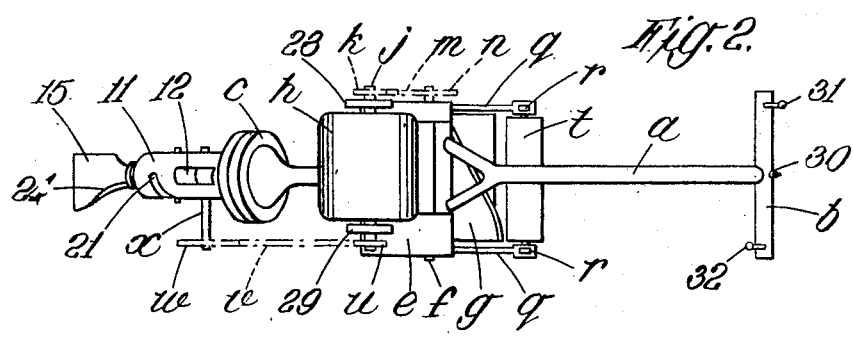
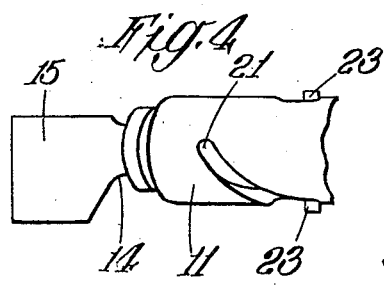
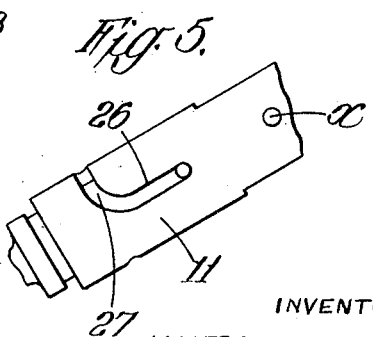
INVENTOR
JAMES DOMINIC BOLONGARO
BY *Hammond & Littell*
ATTORNEYS

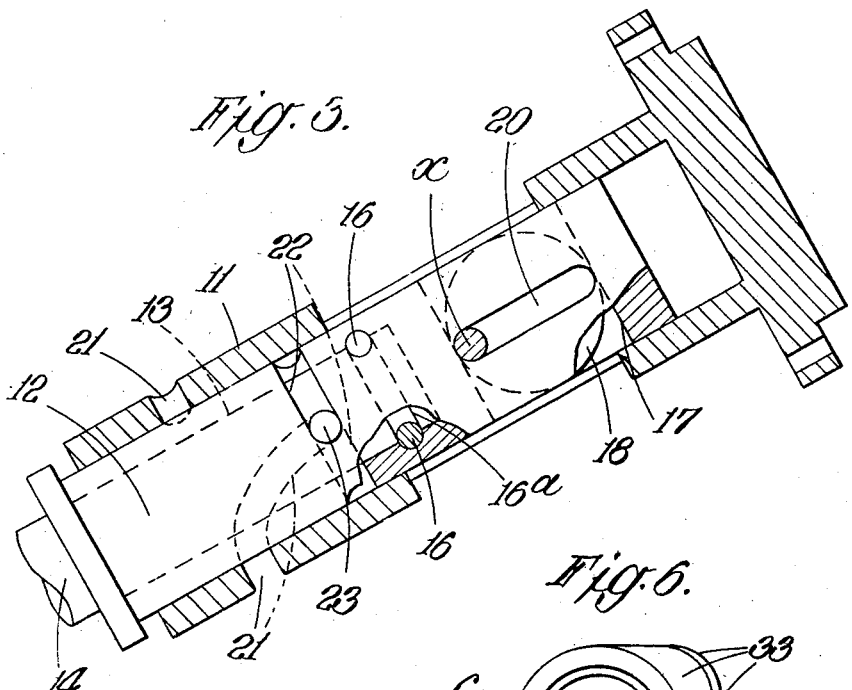
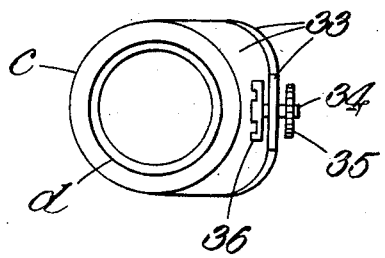
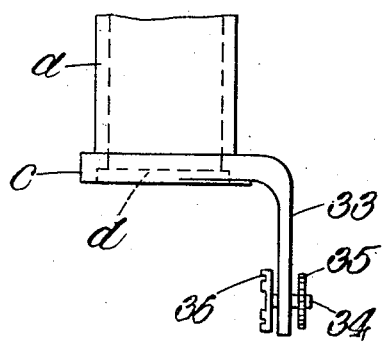
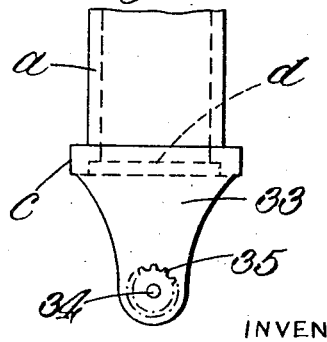
INVENTOR
JAMES DOMINIC BOLONGARO
BY
ATTORNEYS Patented Mar. 13, 1951

2,544,747

UNITED STATES PATENT OFFICE 2,544,747

MOTOR-DRIVEN SPADE

James Dominic Bolongaro, Charlbury, England

Application February 21, 1947, Serial No. 729,980

In Great Britain January 10, 1947

4 Claims. (Cl. 97—44)

This invention relates to a horticultural implement for attachment to a carriage on which is mounted a prime mover, such as an electric motor or a petrol engine, the carriage being intended for use in combination with a variety of implements which may be attached thereto alternatively.

The carriage comprises a shank, provided with a cross handle at its upper end whereby it may be pushed or guided, a frame at the under side of the lower end of the shank having bearings for a spiked, ribbed or like roller, a prime mover such as an electric motor or petrol engine mounted at the lower end of the shank, said lower end being formed with a face plate or seating to which an implement may be attached, the prime mover being intended to drive the roller and/or to actuate the implement.

In the specification accompanying my co-pending application for Letters Patent No. 2,393 of 1946 now British Patent No. 607,063, November 22, 1946, there is described and claimed an improved hoe comprising a hoe blade mounted to be reciprocated or oscillated on such a carriage.

In the said prior invention the hoe may be arranged to be reciprocated by the prime mover through an eccentric, crank shaft or like mechanism, e. g. the blade may be mounted on an eccentrically actuated plunger slidable in a socket or guide mounted on the carriage.

The present invention constitutes an improvement on or modification of the invention forming the subject of the said prior application for Letters Patent and has for its object to enable such an implement to be used as a spade for digging.

To this end and according to the present invention the implement is arranged to be turned angularly during its reciprocatory stroke, the angular movement taking place about the axis of its shank.

The first part of the outward stroke of the implement may be rectilinear and the latter part a combined advancing and angular movement.

The socket in which the shank of the implement is guided may be formed with a slot, the whole or part of which is inclined to the length of said socket, and the shank may have projecting therefrom a pin extending into said slot.

The spade proper may be formed at one side and towards its rear end with an upstanding flange which may be curved somewhat after the fashion of a plough share. Alternatively it may be flat and asymmetrically arranged at one side of its shank, it being understood that the upstanding flange or the asymmetrically disposed portion, as the case may be, is at that side of the blade which is moved upwardly when the turning movement takes place during the outward stroke.

The invention is illustrated by the accompanying drawings in which:

Figure 1 is a partly sectional side elevation of one form of the invention;

Figure 2 is a plan thereof;

Figure 3 is an enlarged sectional elevation of part of the implement shown in Figure 1;

Figure 4 is an enlarged part plan corresponding with Figure 2 but showing a modified shape of spade;

Figure 5 is an enlarged fragmentary side view showing a further modification applicable to either of the forms of the invention shown in Figures 1, 2 and 3;

Figure 6 is an end view, in the direction of the axis of the shank of the carriage, illustrating a still further modification;

Figure 7 is a plan as seen from the top Figure 6; and

Figure 8 is a side view as seen from the right, Figure 7.

In the form of the invention shown in Figures 1 and 2 the carriage comprises an upwardly and rearwardly inclined T-shaped shank $a$ having a cross handle $b$ and formed at its lower end with a disc-like seating $c$ recessed as at $d$. To the underside of the shank $a$ is secured a bifurcated frame $e$ between the limbs of which is mounted a spindle $f$ for a spiked, ribbed or like roller $g$ and above the shank $a$ is mounted an electric motor $h$ on the spindle $j$ of which is a sprocket wheel $k$. The sprocket wheel $k$ is connected by a sprocket chain $m$ with a sprocket wheel $n$ at one end of the spindle $f$ of the roller $g$.

Projecting rearwardly from the lower end of the frame $e$ are arms such as $q$ formed with sockets in which vertical arms such as $r$ may be clamped adjustably for carrying a transverse roller $t$.

At that end of the motor spindle $j$ remote from the sprocket wheel $k$ is another sprocket wheel $u$ connected by a second sprocket chain $v$ with a sprocket wheel $w$ on a spindle $x$ of the implement which forms the subject of this invention.

This implement consists of a tubular part $11$ having a flanged butt end arranged to be secured detachably to the face plate or seating $c$ and in the tubular part $11$ is slidably disposed a plunger $12$. The plunger $12$ is formed with an axial bore $13$ (Figure 3) to receive the shank $14$ of a spade blade 15, the shank 14 being free to turn in the plunger 12 but held against axial movement therein by two pins 16, 16 which extend chordwise of the plunger 12 and engage in a groove 16ª of semi-circular cross-section formed peripherally in the shank 14. Near its rear end the plunger 12 is formed with a slot 17 to accommodate an eccentric 18 mounted on the spindle x which passes transversely through the socket or guide 11 and plunger 12, the latter being slotted longitudinally as indicated at 20, transversely of, and at opposite sides of, the slot 17 to permit the plunger 12 and the spade blade 15 to be reciprocated as the eccentric 18 is rotated.

In order that the spade blade 15 may be turned angularly during its reciprocatory stroke the tubular part 11 is formed with two helical slots, such as 21, and the plunger 12 is formed with two circumferential slots, such as 22. Each of the slots 21 and 22 extends one-quarter of the way around the circumference of the tubular part 11, and into each of said slots there extends a pin 23 projecting radially outwards from the shank 14 and cooperating with the walls of the slots 21 causing the shank 14 to turn about its axis. The slot 22 permits angular movement of the pins 23 relatively to the plunger 12. The spade blade 15 is formed, towards the rear end of that edge thereof which is moved upwardly when the turning movement takes place during the outward stroke, with an upstanding flange 24 curved somewhat after the fashion of a plough share. Alternatively, as shown in Figure 4, the spade blade 15 may be flat and asymmetrically arranged at that side of the shank 14 which moves upwardly as just mentioned.

With either shape of the blade 15 it digs into the earth by its forward movement and, by its angular movement, turns over the earth so dug.

In order that a more decided digging action may take place before the turning over of the earth occurs, the slots 21 may be shaped as indicated in Figure 5, i. e. straight as at 26 for the first part of the outward stroke and then turned sharply as at 27.

Clutches are indicated diagrammatically at 28 and 29 for connecting the sprocket wheels k and u with the motor spindle j or for disconnecting them therefrom.

Suitable controls 30 for the electric motor h and 31, 32 for the clutches 28 and 29 are mounted on the cross handle b of the shank a so that the device as a whole may be propelled and so that, when required, the spade may be operated.

If desired, and as shown in Figures 6, 7 and 8, the lower end of the shank a may be formed with an arm 33 at one side, carrying a bearing for a transverse shaft 34 on the outer end of which is mounted a sprocket wheel 35, to be driven by the sprocket chain v, Figure 1, the inner end of the shaft 34 having thereon a dog clutch member 36 with which may be mated a corresponding dog clutch member, not shown, on the adjacent end of the transverse shaft x of the implement. This arrangement obviates the necessity of providing a sprocket wheel w on the shaft x of the implement and the necessity of disturbing the chain drive v when the implement is detached. Hence this arrangement is eminently suitable for the substitution, on the same carriage, of the implement forming the subject of the present invention, the hoe forming the subject of my co-pending application for Letters Patent No. 2,393 of 1946, the mowing implement forming the subject of my co-pending application for Letters Patent No. 20,776 of 1946, now British Patent No. 614,353, July 11, 1946, or other attachments to the carriage, such for instance as an air compressor for spraying vegetation, or a rotary cutter mounted on a suitable handle and driven through a flexible shaft for hedge trimming and like purposes.

It is to be observed that in the case of the mowing attachment the carriage must be moved forwards, i. e. with the roller g in advance of the cross handle b; in the case of the hoe the carriage may be moved either forwards or backwards; but in the case of the spade forming the subject of the present invention the carriage should be moved backwards and at a slower speed in relation to the rate of reciprocation than in the other cases. To enable this to be done, especially with a carriage arranged as set forth above with reference to Figures 6, 7 and 8, the electric motor h should be of the variable speed reversible type, or, if the prime mover be of the internal combustion engine type, the roller g may be revoluble freely about its shaft f and reversible variable speed gearing may be arranged within said roller g; alternatively some other known means such as a crossed belt or the introduction of spur gearing with an intermediate wheel to reverse the drive may be employed.

I claim:

1. A spade fitting for attachment to a carriage on which is mounted a prime mover, said spade fitting comprising a guiding socket adapted to be mounted on the carriage, a spade blade, a shank on the spade blade, a tubular plunger movable axially in said guiding socket, said shank being disposed in said tubular plunger, a shaft on said guiding socket, an eccentric on said shaft and engaging said tubular plunger to reciprocate it upon rotation of said shaft, at least one curved slot in the guiding socket, a pin on said shank extending into said curved slot, axial movement preventing means connecting the tubular plunger and shank, said means being constructed and arranged so that the shank can turn relative to the plunger, and driving means on said shaft through which to connect it for rotation by the prime mover.

2. A spade fitting as described in claim 1, said spade blade being turned on the axis of its shank by the pin and slot in the outward stroke of the plunger, and said spade blade having an upturned flange curved towards said axis near the rear end of that one of its sides which rises during the outward stroke of the blade.

3. A horticultural implement comprising a carriage, a wheel supporting the carriage, a prime mover on the carriage, driving means for connecting the prime mover with the wheel, a guiding socket mounted on the carriage, a tubular plunger disposed in the guiding socket, a spade blade, a shank on the spade blade disposed in the tubular socket, a shaft on the guiding socket, means for connecting the shaft with the prime mover, an eccentric on the shaft engaging the tubular plunger to reciprocate it upon rotation of the shaft, at least one curved slot in the guiding socket, a pin on the shank extending into said curved slot, axial movement preventing means connecting the tubular plunger and shank, said means being constructed and arranged so that the shank can turn relative to the plunger, and driving means on said shaft through which to connect it for rotation by the prime mover.

4. A horticultural implement for turning earth comprising a carriage, a wheel supporting the carriage, a prime mover on the carriage, driving means for connecting the prime mover with the wheel, a guiding socket mounted on the carriage, a tubular plunger disposed in the guiding socket, a spade blade, a shank on the spade blade disposed in the tubular socket, a shaft on the guiding socket, means for connecting the shaft with the prime mover, an eccentric on the shaft engaging the tubular plunger to reciprocate it upon rotation of the shaft, at least one curved slot in the guiding socket, a pin on the shank extending into said curved slot, axial movement preventing means connecting the tubular plunger and shank, said means being constructed and arranged so that the shank can turn relative to the plunger, and driving means on said shaft through which to connect it for rotation by the prime mover, said spade blade having an upturned flange curved toward the axis of the blade shank near the rear end of that one of its sides which rises during the outward stroke of the blade relative to the socket.

JAMES DOMINIC BOLONGARO.

REFERENCES CITED

The following references are of record in the file of this patent:

UNITED STATES PATENTS

| Number | Name | Date |
|---|---|---|
| 29,782 | Gwynn | Aug. 28, 1860 |
| 45,877 | Stratton | Jan. 10, 1865 |
| 1,191,793 | Johnston | July 18, 1916 |
| 1,224,717 | Darby et al. | May 1, 1917 |
| 1,794,722 | McGlothlen | Mar. 3, 1931 |
| 2,298,792 | Hicks | Oct. 13, 1942 |

FOREIGN PATENTS

| Number | Country | Date |
|---|---|---|
| 936 | Great Britain | of 1872 |
| 273,777 | Germany | May 7, 1914 |